Figure 1:
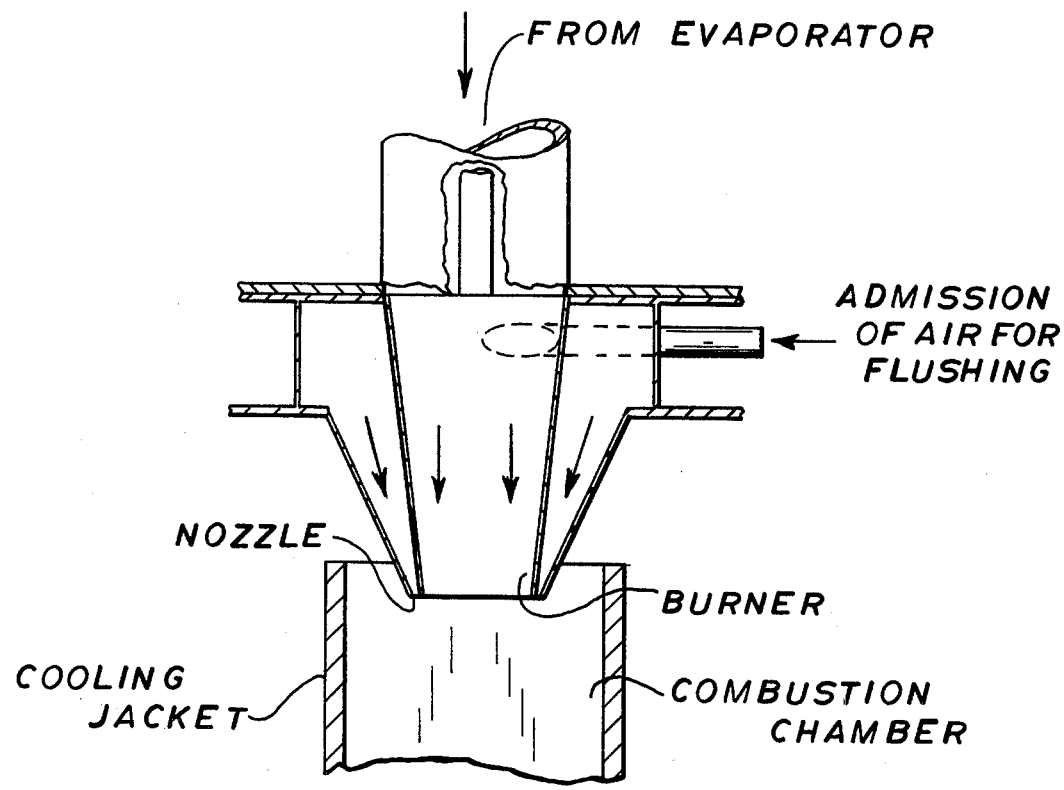

United States Patent [19]

Kratel et al.

[11] 4,108,964

[45] Aug. 22, 1978

[54] PROCESS FOR THE MANUFACTURE OF SILICON DIOXIDE

[75] Inventors: Günter Kratel, Durach-Bechen; Ernst Mühlhofer, Durach; Franz Schreiner, Sulzberg, all of Fed. Rep. of Germany

[73] Assignee: Wacker-Chemie GmbH, Munich, Fed. Rep. of Germany

[21] Appl. No.: 790,502

[22] Filed: Apr. 25, 1977

[30] Foreign Application Priority Data

May 11, 1976 [DE] Fed. Rep. of Germany ....... 2620737

[51] Int. Cl.$^2$ ............................................. C01B 33/12
[52] U.S. Cl. .................................... 423/336; 23/262; 23/277 R; 423/337
[58] Field of Search ............................... 423/336, 337

[56] References Cited

U.S. PATENT DOCUMENTS

| 3,560,151 | 2/1971 | Vogt et al. | 423/337 |
| 3,661,519 | 5/1972 | Driscoll | 423/336 |
| 3,772,427 | 11/1973 | Moore | 423/337 |
| 3,954,945 | 5/1976 | Lange et al. | 423/337 |

FOREIGN PATENT DOCUMENTS

| 214,875 | 7/1956 | Australia | 423/337 |
| 706,807 | 3/1965 | Canada | 423/336 |

Primary Examiner—O. R. Vertiz
Assistant Examiner—Wayne A. Langel
Attorney, Agent, or Firm—Allison C. Collard

[57] ABSTRACT

A process and device for the manufacture of highly disperse silicon dioxide by reacting gaseous organosilanes and other gases that burn with formation of water with oxygen-containing gases in a flame which comprises evaporating the organosilane in an evaporator in such a manner that the level of liquid organosilane is held constant at an organosilane evaporatinng vapor pressure of 0.2 to 1.2 atmospheres gage and, at most, at a temperature of 45° C, preferably 20° to 35° C, above the boiling point of the particular organosilane, maintaining the temperature of the vapor until mixing with the other gases occurs, metering the gas mixture resulting from the mixing through a cone-shaped inlet into a combustion chamber, flushing oxygen-containing gases through an annular nozzle surrounding the inlet into the combustion chamber, and indirectly but positively, cooling the latter.

5 Claims, 2 Drawing Figures

PROCESS FOR THE MANUFACTURE OF SILICON DIOXIDE

It is known to manufacture silicon dioxide (highly disperse silica) by reacting gaseous silicon compounds and, optionally, other gases that burn to form water with oxygen in a flame (compare, for example, German Patent Specification No. 900 339). In this process, satisfactory results are obtained with silicon tetrachloride as the starting material. However, it is often advantageous to use organosilanes as starting materials. With these, however, so far only dark products contaminated by carbon have been obtained.

The object of the invention was, therefore, to provide a method and device by which highly disperse silica without carbon-containing impurities can be manufactured by flame hydrolysis using organosilanes as starting materials.

According to the invention, this object is accomplished by reacting gaseous organosilanes and other gases that burn to form water with oxygen-containing gases in a flame, wherein the organosilane is evaporated in an evaporator in which the level of liquid organosilane is held constant at an organosilane pressure of 0.2 to 1.2, preferably 0.4 to 0.9 atmospheres gage and, at most, at a temperature of 45° C, preferably 20° to 35° C, above the boiling point of the particular organosilane. The temperature of the vapor is maintained until mixing with the other gases occurs, the gas mixture resulting from mixing is metered through a cone-shaped inlet into the combustion chamber, the inlet is centrally surrounded by an annular flushing nozzle, oxygen-containing gases are introduced through this annular flushing nozzle, and the combustion chamber is cooled by means of an indirect positive cooling means.

Surprisingly, the result is that the silicon dioxide manufactured, according to the invention, contrary to the silicon dioxide manufactured from gaseous organosilanes according to hitherto known processes, is of very high chemical purity and is free from carbon-containing impurities.

It is possible to use as organosilanes in the process according to the invention all organosilanes that could be used as gaseous organosilanes in the hitherto known processes for the manufacture of silicon dioxide by reacting gaseous organosilanes and, optionally, gases other than gaseous organosilanes that burn to form water with oxygen in a flame. These are in particular organochlorosilanes produced by reacting silicon or silicon alloys with methyl chloride and tetramethylsilane. Examples of organochlorosilanes that are produced by reacting methyl chloride with silicon or its alloys are methyltrichlorosilane, methyldichlorosilane, dimethyldichlorosilane, and trimethylchlorosilane, as well as symdimethyldichlorodisilane. Methyltrichlorosilane is particularly preferred because it is especially readily available and because it is otherwise not worth exploiting in the quantities that occur. Mixtures of different organosilanes can be used.

The vapor pressure of the organosilane is 0.2 to 1.2, preferably 0.4 to 0.9 atmosphere gage. The temperature of the vapor is at most 45° C above the boiling point of the particular organosilane (at 760 mm), and is preferably 20° to 35° C above. This temperature of the organosilane is maintained until mixing of the silanes with the other gases that decompose to form water occurs. To achieve this, it is often advantageous to protect the pipe between the evaporator, into which the gaseous organosilanes are introduced, and the burner producing the flame, against heat radiation, at least partially by means of heat-insulating materials, or to keep the content of these pipes at the desired temperature by means of a jacket. The heating media in this jacket may be, for example, hot water of a temperature of 95° to 100° C, or water vapor of up to 1.5 atmospheres gage. The heating of the surfaces that give off heat in the evaporator, in which the liquid organosilanes are converted into gaseous organosilanes, may likewise be carried out by using hot water or water vapor.

It is possible to use in the process according to the invention, as gases that burn to form water, all gases burning to form water other than gaseous organosilanes that could be co-used in the hitherto known processes for manufacturing silicon-dioxide by reacting gaseous silicon compounds with oxygen. These other gases are, for example, hydrogen, water gas, city gas, methane, propane and gaseous methanol. It is necessary to add to the organosilanes so much of the gases that burn under water formation that on the one hand hydrolysis of each SiCl-bond can occur, and that, on the other hand, a temperature of 1100° C is achieved in the reaction flame. The molar ratios of organosilane to the gases that form water on combustion are: generally in the range of from 1 : 0 to 1 : 12, preferably from 1 : 3 to 1 : 4.5. There may be used, as oxygen-containing gases, oxygen in pure form or in the form of oxygen mixtures containing at least up to 15% by volume of oxygen, inert gases, such as nitrogen, being added thereto. It is often advantageous to use air.

The organosilanes, the gases that burn to form water and the oxygen-containing gases, are mixed often in a part of the apparatus which is part of the burner. The mixture is metered into the combustion chamber through a cone-shaped inlet. This cone-shaped inlet is centrally surrounded by an annular flushing nozzle. The internal diameter of the nozzle is advantageously approximately 0.2 to 2 mm. Further quantities of oxygen-containing gases are introduced through this annular flushing nozzle. The large amount of heat resulting in the reaction of organosilanes to form highly disperse silica is dispersed by means of an indirect positive cooling system. The cooling can be carried out by cooling the combustion chamber from the outside, for example, by means of air or, alternatively, by cooling the jacket.

The volume ratios of the individual gas components are not of critical importance. Advantageously, the oxygen, as in the case of German Patent Specification No. 900 339, is used in an excess of at least 5% by weight in the process according to the invention. Generally, an excess of 10 to 50% by weight will be adequate. A further excess of 5 to 15%, preferably 10% by weight of gas mixture containing oxygen, is introduced separately through the annular flushing nozzle which centrally surrounds the inlet to the reaction chamber.

The silicon dioxide produced in accordance with the invention generally has a particle size of less than 1 micron and a surface area of, usually, 50 m$^2$/g to 400 m$^2$/g. It is excellently suitable for thickening polar and non-polar liquids and is suitable as a reinforcing filler, in particular, for organopolysiloxane elastomers. These organopolysiloxane elastomers may be those consisting of compositions that can be crosslinked by peroxidic compounds under the application of heat, of so-called one-component systems, or so-called two-component sytems, which crosslink at room temperature, or of compositions crosslinkable by adding Si-bonded hydrogen to aliphatic multiple bonds. In the accompanying drawing, a part of the apparatus according to the invention is schematically shown.

Figure 2:
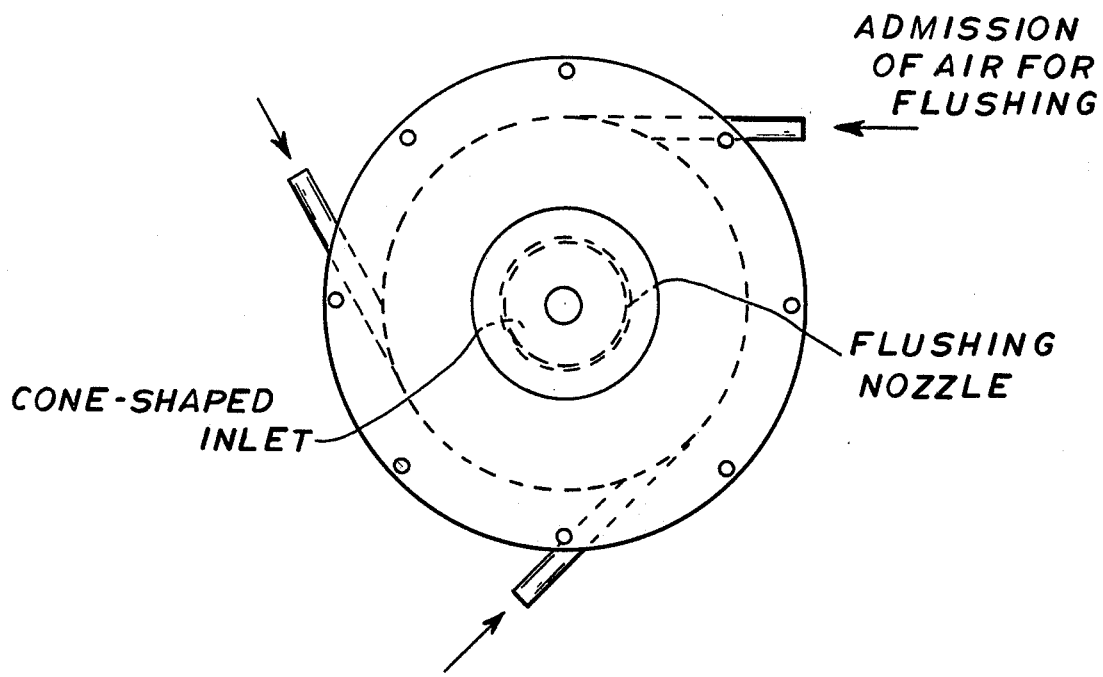

FIG. 1 is an elevation view; and
FIG. 2 is a plan view thereof;

The silane-gas-air mixture is admitted from the evaporator (not shown) by a heated pipe, only the last portion of which is shown. The mixture of organosilane, another gas, and air is introduced into the burner, which has a cone-shaped inlet for passage into a combustion chamber. As shown in FIGS. 1 and 2, the internal diameter of the inlet is 50 mm, but it may be, e.g., 70 mm. The burner orifice is surrounded by an annular flushing nozzle through which additional air is blown toward the orifice. Arranged below the burner is the combustion chamber in which the silicon dioxide is formed. The combustion chamber is surrounded by a cooling jacket.

In the following, the process of the invention will be more fully described in a number of examples which are given by way of illustration and not of limitation.

EXAMPLE 1

28 kg of methyltrichlorosilane per hour are pumped into an evaporator at a pressure of 1.5 atmospheres gage by means of a diaphragm piston pump. The evaporator has a heat-radiating surface, also referred to as a heating surface, which has a size of 0.5 $m^2$ and is heated with water vapor of 0.5 atmospheres gage. The flow of the water vapor is so adjusted by means of a regulator (Samson regulator) which is controlled by the vapor pressure of the methyltrichlorosilane in the evaporator that a constant level of liquid organosilane is maintained and the pressure of 0.5 atmospheres gage of the methyltrichlorosilane likewise is held constant. The temperature is approximately 78° C.

The pipe between the evaporator and the burner is heated by means of a jacket through which water vapor flows at 0.5 atmospheres gage, and is furthermore provided with a regulating device for maintaining the temperature at the desired level.

In the burner, the 28 kg per hour of methyltrichlorosilane are mixed with 15 $Nm^3$ of hydrogen per hour and 105 $Nm^3$ of air per hour and introduced through the cone-shaped inlet into the combustion chamber. The orifice of the burner is sharp edged and thin walled. Its internal diameter is 50 mm.

An air flow of 8 $Nm^3$ per hour is directed towards the orifice of the burner and flows out of the annular flushing nozzle surrounding the burner orifice and having an internal diameter of 0.5 mm.

The reaction chamber having a diameter of 60 cm and a length of 350 cm is surrounded by a jacket which is fixed at a distance of 5 cm. 800 $m^3$ of air of 20° C is sucked through this gap per hour.

Highly transparent silicon dioxide having a particle size of less than 1 micron and a surface area, measured according to the BET method, of 207 $m^2/g$ is obtained.

EXAMPLE 2

The method of operation described in Example 1 is repeated, except that instead of 15 $Nm^3$ of hydrogen and instead of 105$Nm^3$ of air, 1.2 $Nm^3$ of propane and 125 $Nm^3$ of air are mixed per hour with 28 Kg/h of methyltrichlorosilane in the burner, and also the internal diameter of the burner orifice is not 50 mm but 70 mm.

Silicon dioxide having a particle size of less than 1 micron and a surface area, measured according to the BET method, of 196 $m^2/g$ is obtained.

EXAMPLE 3

The method of operation described in Example 1 is repeated except that instead of 28 Kg/h of methyltrichlorosilane, 30 Kg of dimethyldichlorosilane are used per hour, instead of 15 $Nm^3$ of hydrogen and instead of 105 $Nm^3$ of air, 1.2 $Nm^3$ of propane and 125 $Nm^3$ of air are mixed per hour with the gaseous dimethyldichlorosilane in the burner, and the internal diameter of the burner orifice is not 50 mm but 70 mm.

Silicon dioxide having a particle size of less than 1 micron and a surface area, measured according to the BET method, of 189 $m^2/g$ is obtained.

EXAMPLE 4

The method of operation described in Example 3 is repeated except that instead of 30 Kg of dimethyldichlorosilane, a mixture of 15.5 Kg of methyltrichlorosilane and 10 Kg of tetramethylsilane is used per hour and instead of 125 $Nm^3$, 140 $Nm^3$ of air is mixed per hour with the mixture of organosilanes in the burner.

Silicon dioxide having a particle size of less than 1 micron and a surface area, measured according to the BET method, of 123 $m^2/g$ is obtained.

From the foregoing description, one skilled in the art can easily ascertain the essential characteristics of this invention, and without departing from the spirit and scope of the invention thereof, can make various changes modifications of the invention to adapt it to various usages and conditions. Consequently, such changes and modifications are properly, equitably, and intended to be, within the full range of equivalence of the following claims.

What is claimed is:

1. A process for the manufacture of highly disperse silicon dioxide by reacting gaseous organosilane and other gases that burn to form water other than gaseous organosilane and with oxygen-containing gases in a flame which comprises the steps of:

evaporating the organosilane in such a manner that the level of liquid organosilane is held constant, at a vapor pressure of 0.2 to 1.2 atmospheres gage and at most at a temperature of 45° above the boiling point of the particular organosilane, maintaining the temperature of the vapor until mixing with said other gases and said oxygen-containing gases occurs, metering the gas mixture resulting from the mixing through a cone-shaped inlet into a combustion chamber, flushing oxygen-containing gases through means surrounding the inlet into the combustion chamber, and indirectly but positively cooling said combustion chamber.

2. The process according to claim 1, wherein the vapor pressure of the organosilane is from 0.4 – 0.9 atmospheres gage.

3. The process according to claim 1, wherein the temperature above the boiling point of the organosilane is from 20°– 35° C.

4. The process according to claim 1, wherein a temperature of about 1100° C is maintained in said flame.

5. The process according to claim 1, wherein the oxygen-containing gases flushed through said means surrounding the inlet comprises at least 15% by volume of oxygen.

* * * * *